United States Patent Office 3,632,675
Patented Jan. 4, 1972

3,632,675
PREPARATION OF IMPACT RESISTANT
STYRENE POLYMERS
Rosalina S. Foglesong and Harold Jabloner, Wilmington, Del., assignors to Hercules Incorporated, Wilmington, Del.
No Drawing. Filed May 28, 1969, Ser. No. 828,765
Int. Cl. C08f 41/12, 19/04
U.S. Cl. 260—876 R               2 Claims

ABSTRACT OF THE DISCLOSURE

Polystyrene and copolymers of styrene with vinyl monomers such as acrylonitrile are improved with respect to their impact strength by incorporation therein of small particles of an ethylene-α-olefin copolymer having grafted to their surfaces a monomer which is compatible with the styrene polymer. The copolymer is preferably a partially crystalline copolymer of ethylene and propylene.

This invention relates to moldable reinforced thermoplastic polymer compositions having high impact strength and good environmental stability.

In recent years, the so-called "ABS" plastics have become increasingly popular molding materials for a wide variety of industrial and consumer products in which high impact strength is desired. The designation "ABS" plastics refers to materials based on acrylonitrile, butadiene and styrene. Physically, they consist of a matrix of a rigid styrene-acrylonitrile (SAN) thermoplastic copolymer having discrete particles of butadiene-acrylonitrile copolymer rubber dispersed uniformly therein. The value of such plastics lies in their unique combination of the good tensile properties, abrasion resistance, chemical resistance and rigidity of the SAN matrix with high impact strength imparted by the rubber particles dispersed therein. This impact strength is believed to be the result of the elasticity of the rubbery copolymer which causes a substantial amount of the impact energy to be dissipated in elongating the rubber. Absent the rubbery disperse phase, the impact can break the SAN relatively easily, thanks to its rigidity and accompanying low elongatoability.

In accordance with this invention, thermoplastic molding materials are provided comprising a styrene polymer matrix reinforced with a partially crystalline disperse phase and which have substantially better impact strength than known commercial ABS polymers. It has been found that improved reinforced thermoplastic materials are prepared if the dispersed phase is a copolymer of ethylene and a second olefin in fine particle form modified by grafting therewith a SAN compatible monomer.

Stated more completely, the invention is a thermoplastic composition comprised of (1) a styrene polymer matrix phase and (2) a reinforcing phase consisting essentially of a partially crystalline copolymer of ethylene and an α-olefin having 3 to 20 carbon atoms being in the form of particles of about 0.02 to about 5 microns and which has been modified by grafting thereto a monomer compatible with the matrix phase. Normally the matrix phase will constitute about 35 to 90% by weight of the total composition and the reinforcing phase about 65 to 10%. The reinforcing phase should be grafted to the extent of about 10 to 60% by weight based on the total weight of the reinforcing phase.

The styrene polymers which can be used as the matrix phase of the compositions of this invention are well known articles of commerce. In addition to styrene homopolymers, homopolymers of such derivatives of styrene as α-methyl styrene and halogenated styrenes can be used. Also, copolymers of these monomers with each other or with up to about 50% of a copolymerizable vinyl monomer or combination of vinyl monomers such as acrylonitrile, acrylamide, methacrylic acid, methyl acrylate, methyl methacrylate and acrylic acid can be employed. A particularly preferred matrix polymer is a copolymer of 65 to 76% styrene and 35 to 24% acrylonitrile. Such copolymers are commonly prepared by free radical polymerization of the selected monomers by solution or emulsion techniques.

The particulate ethylene copolymer is a partially crystalline material containing about 75 to 98% by weight ethylene and 25 to 2% of an α-olefin having 3 to 20 carbon atoms, preferably 3 to 6 carbon atoms. A preferred α-olefin is propylene. By partially crystalline is meant that each copolymer molecule contains some portion which is capable of fitting into a crystal lattice structure as is formed by, e.g. an ethylene homopolymer upon solidifying from the molten state. Since crystallinity measurements are usually difficult to obtain, crystallinity is frequently measured and expressed as heat of fusion. Thus, the copolymers useful in this invention have a heat of fusion between about 11 and 35 calories/gram. The amorphous portion of the polymer can be found both as a small amount of a totally distinct material which can be extracted from the copolymer mass and as amorphous portions of individual copolymer molecules. The presence of these amorphous portions within individual molecules is essential to provide the required elasticity to the copolymer phase. The presence of the extractable portion is not necessary. In fact, if the extractable portion is too high, it can detract from the impact strength imparted to the resin. It should be maintained less than about 50% of the total copolymer.

The partially crystalline copolymer is in the form of tiny particles in the range of about 0.02 micron to about 5 microns. The small particle size is required in order to provide a greater density of particles per unit of matrix, and thus a uniform degree of reinforcement throughout the matrix. These copolymers can have a reduced specific viscosity (RSV) ranging from about 1 to 40. Preferably the RSV will be at least about 8. A method for the preparation of these copolymers is taught in Belgian Pat. 708,834.

The copolymer, per se, being essentially a long chain, non-polar hydrocarbon, has no affinity for the matrix polymer. Thus, some means of bonding the copolymer to the matrix must be provided. This is effected by grafting to the surface of the copolymer a chemical unit which has affinity for the matrix polymer.

To prepare the surface-grafted ethylene copolymer, the particulate copolymer is suspended in an organic liquid, such as benzene, which is resistant to free radical attack and is oxidized with oxygen and a free radical source. Free radical sources which can be employed include hydroperoxides such as cumene hydroperoxide, p-methane hydroperoxide, diisopropylbenzene mono-hydroperoxide, etc., peroxides such as dicumyl peroxide, benzoyl peroxide, diacetyl peroxide, etc., persulfates and peroxycarbonates such as sodium persulfate, diethyl peroxydicarbonate, etc., and azo compounds such as azo-bis(isobutyronitrile). The resulting polymer hydroperoxide will contain about 0.02 to 0.35 meq. of OOH/gram, equivalent to 0.016 to 0.29% active oxygen by weight. The oxidation must be carried out at a temperature below the solution temperature of the ethylene copolymer in order to maintain the copolymer in its original particulate form. A free radical polymerizable monomer as defined above or a mixture of such monomers is then added to the dispersion of copolymer hydroperoxide in the presence of a redox catalyst to decompose the hydroperoxide and catalyze the grafting of the monomer onto the copolymer surface and the subsequent polymerization thereof. Some free (ungrafted) polymerization of the monomer also takes place, but this is not harmful since the free polymer will be compatible with the matrix.

The surface grafted ethylene copolymer particles are dispersed in the matrix polymer by adding the particles to a solution of the polymer in a liquid wherein the ethylene copolymer is not also soluble such as, e.g. an aliphatic or aromatic hydrocarbon at room temperature. This solution-dispersion is agitated vigorously to insure homogeneous mixing and the dissolved polymers are precipitated wth a non-solvent such as alcohol or water. The precipitated product is then recovered, dried, and used in conventional molding or extrusion processes. The softening temperature of the matrix polymer must be such that the ethylene copolymer remains in its solid particulate form during the molding operation and in the finished article.

The ethylene copolymer employed in this invention will usually be stabilized against degradation due to heat and light as is customary in the olefin polymers art. Any of the conventional stabilizers and stabilizer systems can be used. Many such stabilizer systems are known and readily available to the practitioner.

Reinforced polymer according to this invention can be used in any application where the previously known ABS plastics have been employed. Such uses include, e.g. extruded plastic pipe, shoe heels, appliance cases such as for small radios, automobile parts and others where high impact strength may be desirable or necessary.

The following examples illustrate the invention. The reduced specific viscosity (RSV) of the ethylene copolymer was determined on a 0.1% solution in decahydronaphthalene at 135° C. Parts and percentages are by weight unless otherwise specified.

EXAMPLE I

A resin kettle equipped wth stirrer, condenser, dropping funnel and sparge tube was charged with 876 parts of a 5.27% by weight dispersion in chlorobenzene of a copolymer containing 12.4 weight percent propylene and 87.6 weight percent ethylene, having a heat of fusion of 28.8 calories per gram and being in the form of particles of an average of 0.4μ and having an RSV of 27.3. The dispersion was sparged with air for about 40 minutes at room temperature, then heated to 50° C. over about 10 minutes with continued sparging. After 10 minutes at 50° C., about 0.14 part of diisopropylperoxydicarbonate dissolved in chlorobenzene was added over a period of several minutes. The dispersion was held at 50° C. for 26 hours and then allowed to cool. Analysis indicated the hydroperoxide content of the dispersion to be 0.058 meq. OOH/gram of copolymer.

A 198.7 parts portion of the dispersion of copolymer hydroperoxide, 0.135 part benzoin, and a mixture of 17.3 parts of acrylonitrile and 48.8 parts styrene were stirred together in a pressure reactor and flushed with nitrogen for 20 minutes. The mixture was heated for 5 minutes at 50° C., then a solution of 0.022 part ferric acetylacetonate and 0.22 part triethylamine in chlorobenzene was added and the reaction mixture was agitated at 50° C. for four hours.

At the end of the 4 hour reaction period, the dispersion of graft copolymer which contained 36% grafted SAN was blended with 258 parts of a 8.93% solution of a styrene-acrylonitrile (SAN) copolymer (27% AN) in chlorobenzene. To this was added 0.055 part of trilauryltrithiophosphate and the mass was agitated vigorously to effect uniform blending. The mixture was then precipitated by adding to methanol while agitating, collected and washed again with methanol, filtered, then slurried in methanol containing 0.011 part of a phenolic antioxidant and the methanol was removed under vacuum at room temperature. Nitrogen analysis indicated the product contains about 70% SAN.

The product was compression molded into .40 mil plagues 4" x 4" square in a hydraulic press for 5 minutes. These were tensile tested at room temperature at 0.2 inch/minute and also at 1000 inches/minute, along with a control specimen of unreinforced SAN copolymer and a typical commercial ABS plastic specimen.

| | 0.2 inch/minute | | 1,000 inches/minute | | | |
|---|---|---|---|---|---|---|
| | Tensile strength, p.spi. | Modulus | Tensile | Modulus | Elongation, percent | Unnotched impact, ft. lbs./in.² |
| SAN | 9,700 | 280,000 | 13,400 | 500,000 | 2.8 | 14.6 |
| ABS | 4,600 | 190,000 | 6,700 | 220,000 | 20 | 90 |
| Ex. 1 | 5,000 | 165,000 | 7,800 | 420,000 | 26 | 150 |

EXAMPLE 2

A coplymer of ethylene and propylene (15.6% propylene, heat of fusion 24.6 calories per gram, RSV 21.4, average particle size 0.4μ) dispersed in benzene was oxidized to the hydroperoxide form following substantially the procedure described in Example 1. The hydroperoxide content of the resultant product was about 0.052 meq. OOH/gram copolymer.

A 221.7 parts portion of this dispersion (5.17% solids) was stirred in a pressure reactor with 0.127 part benzoin, 21.04 parts acrylonitrile, and 59.26 parts styrene and flushed with $N_2$ for 20 minutes to exclude oxygen. The mxiture was heated for 5 minutes at 50° C., and a solution of 0.0212 part of ferric acetylacetonate and 0.21 part of triethylamine in about 5 parts chlorobenzene was added while excluding air. The reaction mixture was stirred at the reaction temperature for four hours.

The product was between with 25.6 parts of styrene-acrylonitrile copolymer (30% AN) dissolved in chlorobenzene and containing 0.05 part trilauryltrithiophosphite. This was precipitated with methanol, then washed with methanol containing 0.011 part phenolic antioxidant, and the methanol was removed under reduced pressure. Nitrogen analysis indicates the SAN content to be about 77.6%. Low and high speed tensile tests were as follows:

| | 0.2 inch/minute | | 1,000 inches/minute | | | |
|---|---|---|---|---|---|---|
| | Tensile strength | Modulus | Strength | Modulus | Elongation, percent | Impact, ft. lbs./in.² |
| SAN | 10,300 | 269,000 | 13,000 | 520,000 | 2.4 | 13 |
| Ex. 2 | 4,900 | 151,000 | 8,500 | 360,000 | 18 | 110 |

What we claim and desire to protect by Letters Patent is:

1. A thermoplastic composition comprised of:
   (1) a matrix phase comprised of a copolymer of styrene and acrylonitrile containing about 65 to 76% styrene and about 24 to 35% of acrylonitrile; and
   (2) a reinforcing phase consisting essentially of a copolymer of about 75 to 98% of ethylene and about 2 to 25% of a second α-olefin having 3 to 20 carbon atoms, having a heat of fusion between about 11 and 35 calories per gram, being in the form of particles of about 0.02 to 5 microns, and which has been modified by grafting to its surface about 10 to 60% of a copolymer of styrene and acrylonitrile based on the weight of the ethylene copolymer;

said matrix phase constituting about 35 to 90% and said reinforcing phase constituting about 10 to 65% by weight of the total composition.

2. The composition of claim 1 where the particulate copolymer is a copolymer of ethylene and propylene.

References Cited

FOREIGN PATENTS

| | | | |
|---|---|---|---|
| 879,907 | 10/1961 | Great Britain | 260—878 |
| 917,498 | 2/1963 | Great Britain | 260—878 |
| 1,009,719 | 11/1965 | Great Britain | 260—878 |
| 1,495,760 | 8/1967 | France | 260—878 |

MURRAY TILLMAN, Primary Examiner

H. W. ROBERTS, Assistant Examiner

U.S. Cl. X.R.

260—88.2 R, 878 R